United States Patent
Micheva et al.

(10) Patent No.: US 10,133,446 B2
(45) Date of Patent: Nov. 20, 2018

(54) CONTENT CHASE-ABILITY FOR APPS

(71) Applicant: Microsoft Technology Licensing, LLC, Redmond, WA (US)

(72) Inventors: Nora I. Micheva, Seattle, WA (US); Matthew Gregory Hidinger, Seattle, WA (US); Andrew Tyler Bares, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 15/078,765

(22) Filed: Mar. 23, 2016

(65) Prior Publication Data
US 2017/0277391 A1 Sep. 28, 2017

(51) Int. Cl.
*G06F 9/451* (2018.01)
*G06F 3/0481* (2013.01)
*G06F 3/0482* (2013.01)

(52) U.S. Cl.
CPC ........ *G06F 3/04817* (2013.01); *G06F 3/0482* (2013.01); *G06F 9/451* (2018.02)

(58) Field of Classification Search
CPC ... G06F 3/0482; G06F 3/04817; G06F 9/4443
See application file for complete search history.

(56) References Cited

U.S. PATENT DOCUMENTS

| 7,577,922 | B2 | 8/2009 | Mann et al. | |
| 7,673,255 | B2 | 3/2010 | Schechter et al. | |
| 8,887,202 | B2 | 11/2014 | Hunter et al. | |
| 9,020,565 | B2 | 4/2015 | Flynt et al. | |
| 2004/0155909 | A1* | 8/2004 | Wagner | G06F 3/04817 715/854 |
| 2012/0246577 | A1* | 9/2012 | Klassen | G06F 3/04817 715/752 |
| 2012/0304118 | A1* | 11/2012 | Donahue | G06F 3/04817 715/808 |
| 2013/0138723 | A1 | 5/2013 | Ku et al. | |
| 2013/0263053 | A1* | 10/2013 | Tritschler | G06F 9/4443 715/835 |

(Continued)

FOREIGN PATENT DOCUMENTS

WO 2014158224 10/2014

OTHER PUBLICATIONS

International Search Report and the Written Opinion issued in PCT Patent Application No. PCT/US2017/023118 dated Jun. 7, 2017.

(Continued)

*Primary Examiner* — Jennifer N To
*Assistant Examiner* — Amy P Hoang
(74) *Attorney, Agent, or Firm* — Workman Nydegger

(57) ABSTRACT

Providing context from a dynamic icon to an underlying application. A method includes displaying dynamically, at a dynamic icon, a plurality of context elements. Each of the context elements corresponds to an item available in an application underlying the dynamic icon. The method further includes receiving user input at the dynamic icon indicating a desire to open an application underlying the dynamic icon. The method further includes, providing to the application underlying the dynamic icon an indication of a context element that was being displayed at the dynamic icon when the user input was received.

17 Claims, 5 Drawing Sheets

(56) References Cited

U.S. PATENT DOCUMENTS

2014/0325430 A1 10/2014 Vranjes et al.
2016/0048294 A1 2/2016 Micheva

OTHER PUBLICATIONS

Anonymous: "App Widgets; Android Developers", Aug. 6, 2013. Retrieved from the Internet: https://web-beta.archive.org/web/20130806035030/http://developer/android.com/guide/topics/appwidgets/index.html [retrieved on Apr. 12, 2017] p. 11-p. 18.

Wei, et al., "Windows Store App Notifications with Live Tiles and Badges", Published on: Jul. 8, 2013 Available at: https://software.intel.com/en-us/articles/windows-store-app-notifications-with-live-tiles-and-badges.

Hale, David, "Update a live tile from a background task", Retrieved on: Mar. 12, 2016 Available at: https://msdn.microsoft.com/en-us/windows/uwp/launch-resume/update-a-live-tile-from-a-background-task.

"Tile design guidelines for Windows Phone", Published on: Jul. 25, 2014 Available at: http://msdn.microsoft.com/en-us/library/windows/apps/jj662929(v=vs.105).aspx.

* cited by examiner

CONTENT CHASE-ABILITY FOR APPS

BACKGROUND

Background and Relevant Art

Computers and computing systems have affected nearly every aspect of modern living. Computers are generally involved in work, recreation, healthcare, transportation, entertainment, household management, etc.

A computing device may host a number of applications on the computing device. Often, the computing device will also display a number of icons that allow a user to access applications by selecting a corresponding icon. In some computing systems, the icons can be dynamic icons that dynamically display information on the icon. For example, a dynamic weather icon may display current temperature where the current temperature is provided from an underlying application underlying the icon. Alternatively or additionally, a dynamic icon may display an element summarizing a news article where the summarized news article can be accessed on an application underlying the dynamic icon. In yet another example, a dynamic icon may display, dynamically, various thumbnail images of image files that may be obtained by accessing a photo application underlying the dynamic icon. Dynamically displaying thumbnails in a dynamic icon may include the dynamic icon iteratively displaying various thumbnails of the image files available using the photo application underlying the dynamic icon. One example of dynamic icons is Live Tiles available from Microsoft Corporation of Redmond Wash.

Users may be frustrated when they see something on an application's dynamic icon, select the dynamic icon to launch the underlying application, but then cannot easily find the item corresponding to the element being displayed when the user launches the application by selecting the dynamic icon.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing context from a dynamic icon to an underlying application. The method includes displaying dynamically, at a dynamic icon, a plurality of context elements. Each of the context elements corresponds to an item available in an application underlying the dynamic icon. The method further includes receiving user input at the dynamic icon indicating a desire to open an application underlying the dynamic icon. The method further includes, providing to the application underlying the dynamic icon an indication of a context element that was being displayed at the dynamic icon when the user input was received.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Dynamic icons display elements with information corresponding to items inside a corresponding application. For example, a dynamic icon for a news application can display an element with a summary or title of a news article accessible in the news application. A user can select a dynamic icon, to invoke a corresponding application, while an element corresponding to an item available in the application is being displayed in the dynamic icon. Embodiments herein can provide information from a dynamic icon to the corresponding application, where the information includes an indication of what element was being displayed when a user selected the dynamic icon to invoke the application. In particular, when an application is invoked, it will have knowledge of what is being presented to the user in a corresponding dynamic icon. This enables the application to perform one or more contextual actions, such as automatically navigating a user to the "home" of the application, automatically navigating directly to content items corresponding to elements displayed in the dynamic icon, highlighting content items in an items list corresponding to elements displayed in the dynamic icon, etc.

For example, if a user saw a summary of a news story about puppies on the dynamic icon for a news application when the user selected the icon to invoke the news application, the news application could ensure that the puppies news story is displayed front and center when the application is launched. Alternatively, the application could display a list of news stories, but highlight the news story about puppies to differentiate it from other news stories in the list of news stories.

Figure 1:
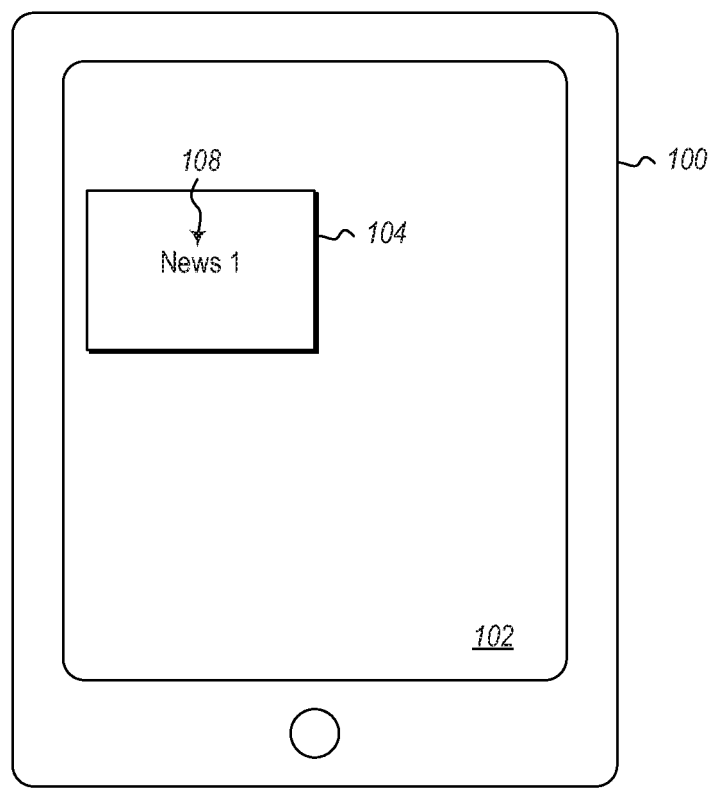
FIG. 1 illustrates a device displaying a dynamic icon.
Figure 2:
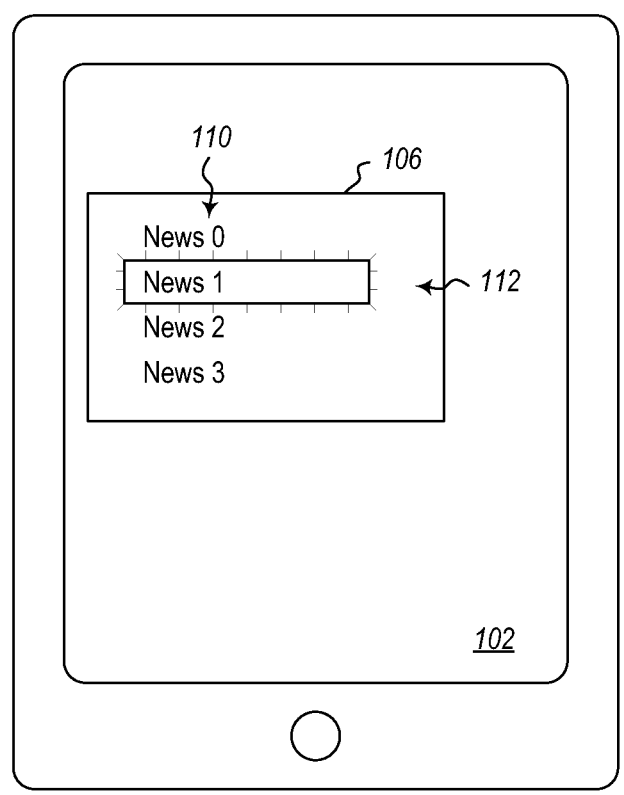
FIG. 2 illustrates the device displaying an application including the device displaying a list with an item in the list highlighted where the item corresponds to an element being displayed in a dynamic icon.
Figure 3:
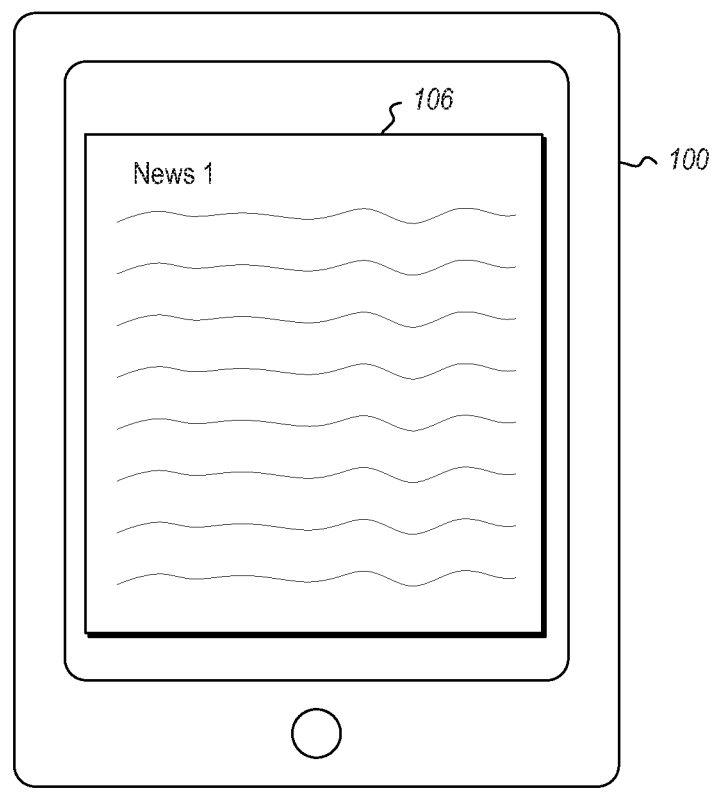
FIG. 3 illustrates the device displaying in an application an item corresponding to an element displayed in the dynamic icon.

Referring now to FIGS. 1-3, examples are illustrated, FIG. 1 illustrates a device 100. The device 100 may be, for example, a smart cellular phone, a computer system, or other computing device. The device 100 includes a screen 102 and the computer system can include an operating system that supports the functionality described herein. In the example illustrated in FIG. 1, the device 100 displays a dynamic icon 104 on the screen 102. The computing system can cause display of the dynamic icon 104 on the screen 102.

The computer system is associated with an application 106 that is managed by the operating system. The dynamic icon 104 is a symbol or a representation of the application 106. In particular, the dynamic icon is a symbol or representation of items associated or available at the application 106. For example, an item may be specific content of the application 106 (see FIG. 2) running on the device 100. The dynamic icon 104 may be associated with a news application configured to provide digital news information to a user via the screen 102 of the device 100.

As used herein, the term "display" can be used to refer to the computer system communicating instructions such that the dynamic icon is configured to represent various elements. In this regard, the dynamic icon 104 dynamically displays various elements related items available from the application 106. For example, the dynamic icon 104 may dynamically display different summary elements where each summary element is correlated to a new story available from the application 106. The elements may be displayed in a dynamically changing fashion such that different elements are displayed over time. FIG. 1 illustrates a static snapshot in time where an element 108 is displayed that corresponds to a new story available in the application 106.

In the example illustrated, when a user selects the dynamic icon 104, the application 106 will be launched as illustrated in FIG. 2. Because the dynamic icon 104 is selected while the dynamic icon 104 is displaying the element 108, information is transmitted about the dynamic icon 104 to the application 106 indicating that the dynamic icon was selected when the element 108 was being displayed. The application 106 can use information indicating what elements were displayed at the dynamic icon 104 when the dynamic icon 104 was selected to provide various novel and useful user interface interactions.

For example, as illustrated in FIG. 2, the application 106 can display a list 110 of the items. As illustrated at 112 the application 106 can highlight an item corresponding to the element 108 displayed in the dynamic icon 104. Highlighting may include displaying the item corresponding to the element 108 in a contrasting fashion with respect to other items in the item, list 110. Examples of such a contrasting fashion may include one or more of contrasting colors, contrasting shading, outline elements, contrasting animation, etc.

Embodiments may be implemented where the item list 110 is constructed based on knowledge about what element was displayed at the dynamic icon 104. In particular, the list 110 may have items selected to be in the list based on the information from the dynamic icon 104. For example, embodiments can ensure that the list 110 contains the item corresponding to the element 108 displayed in the dynamic icon 104. Alternatively or additionally, the list 110 may be ordered in a particular way based on knowledge about the element 108 displayed at the dynamic icon 104. For example, an item corresponding to the element 108 may be displayed at the top of the list or in the very center f the list.

In this fashion, when a user selects the dynamic icon 104 while the element 108 is being displayed, the user can maintain item context in the application 106 by the application highlighting an item corresponding to the element 108 as illustrated at 112. This allows the user to more easily navigate the user interface of the application 106. Thus, a user will not need to navigate various menu structures or other user interface elements to try and find an item correlated to the element 108 displayed in the dynamic icon 104. This can result in the device 100 being more energy efficient as items can be identified more quickly, with less user interaction and less computing resources used as a user navigates through the graphical user interface of the application 106.

An alternative example is illustrated in FIG. 3. In the example illustrated in FIG. 3, the application 106 navigates automatically to the item corresponding to the element displayed in the dynamic icon 104. Thus, rather than displaying the item in a list of items 110, and highlighting the item corresponding to the element 108 as illustrated at 112 in FIG. 2, the item can be opened and displayed without the user needing to interact with the list 110. Rather the item is opened directly as a result of the user selecting the dynamic icon 104 while the element 108 is being displayed at the dynamic icon 104.

Various additional alternative actions may be taken by the application by knowing what element is displayed in a dynamic icon when the dynamic icon is selected to launch an application.

Additional technical details are now illustrated.

Figure 4:
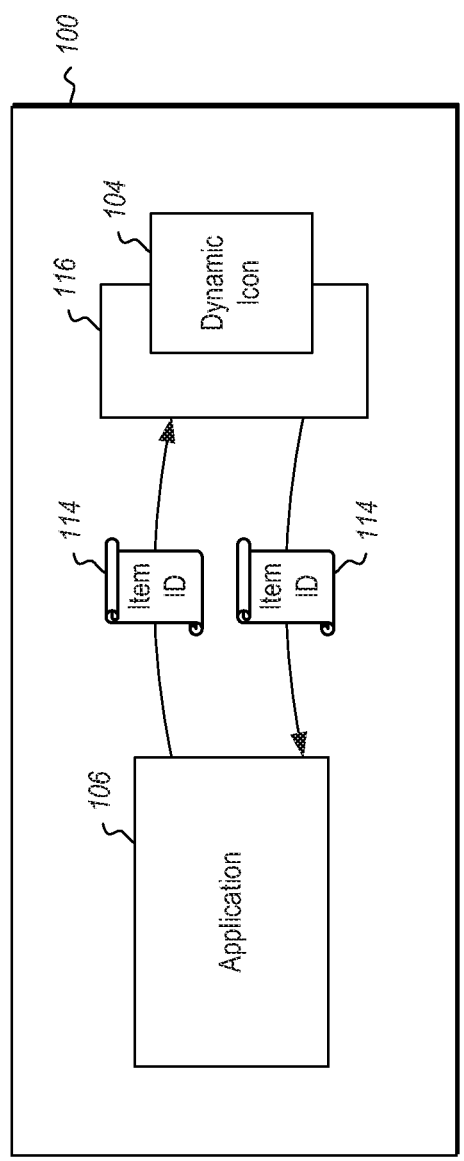
FIG. 4 illustrates a block diagram of a system for providing dynamic icon context to an application.

FIG. 4 illustrates a block diagram of the device 100. In particular, the block diagram illustrated in FIG. 4 illustrates the device 100 along with a block diagram representation of the application 106 and a block diagram representation of the dynamic icon 104. The application 106 can send information to cause the dynamic icon 104 to display elements to a user of the device 100. In some embodiments, the application 106 can send all, or a portion of an item available at the application 106 to the dynamic icon 104 which can be used to create and/or display elements to a user via the dynamic icon. As part of this process, the application 106 can send an item ID 114 to an agent 116, where the agent 116 has knowledge of the dynamic icon 104. Thus, the dynamic icon 104 can be used to correlate elements displayed at the dynamic icon 104 with item identifiers for items at the application 106.

When the user selects the dynamic icon 104, such as by tapping on the dynamic icon 104, the agent 116 will know what element is being displayed at the dynamic icon 104 and will also know a corresponding item ID 114 for the element being displayed at the dynamic icon 104. The agent 116 can then send back to the application 106 the item ID 114 corresponding to the element being displayed in the dynamic icon 104 when the dynamic icon 104 is selected to launch the application 106.

The application 106 can use this information, i.e. the item ID 114, to perform various useful actions. For example, as illustrated above, the application 106 can use this information to highlight an item in a list of items. Alternatively or additionally, the application 106 can use this information to automatically navigate to an item as illustrated in FIG. 3, or other actions.

For example, in some embodiments the application 106 can determine various user preferences. For example, the application 106 knows when an item ID 114 was sent to the agent 116 in conjunction with sending information to the dynamic icon 104 for display. The application 106 can also know when the item ID 114 is sent back from the agent 116 to the application in conjunction with a user selecting the dynamic icon 104 to launch the application 106. Thus, an application 106 can determine an amount of time from when an element is available at the dynamic icon 104 to when a user selects the dynamic icon 104. This can facilitate the application 106 determining the types of items the user is interested in or the types of items that the user is most interested in. In particular, if a user selects the dynamic icon 104 more quickly for certain types of elements corresponding to certain types of items at the application 106, the application 106 can determine that the user has a preference for those certain types of items. The application 106 can then modify information sent to the dynamic icon 104 such that the dynamic icon 104 displays elements according to user preferences.

Embodiments may also be able to determine when a user is interested in certain types of items available at the application 106. For example, the user may select the dynamic icon 104 to launch the application 106 at certain times of the day for one category of elements and select the dynamic icon 104 to launch the application 106 more at other times of the day for a second category of elements. For example, a user may select the dynamic icon 104 during work hours when the dynamic icon 104 displays elements related to business topics while selecting the dynamic icon 104 during non-work hours when the dynamic icon displays elements related to puppies. By the agent 116 identifying items available at the application 106, the application can know what items are of interest to the user. This can be time based as described above, or time independent, such that an application 106 can begin to identify user preference for content.

The application 106 and dynamic icon 101 can use this information to customize what elements are displayed to a user in the dynamic icon 104 and what items are available (or at least prominent) to a user at the application 106.

Illustrated now in one example detailed embodiment, developers send notifications to their applications' tiles to show live content. Some embodiments add an optional "arguments" parameter to a dynamic icon notification. For example, the developer for a news application could set "newsstoryid=123456" as the value for the "arguments" parameter to identify the news story.

An application agent service, such as "Start" available on operating systems from Microsoft Corporation of Redmond Wash. can keep track of the notifications a user sees on dynamic icons.

When the application is launched, the list of all viewed notifications (with the "arguments" property) will be included in a new property in the LaunchActivatedEventArgs in the OnLaunched method. In the illustrated embodiment, the notifications are retained in reverse chronological order, meaning that the first notification in the list is the one that was visible when the application was launched and the second one in the list is the second most recent notification that the customer saw in the dynamic icon and so forth.

Based on this information, the developer can tailor their in-application experience.

Various different types of applications and dynamic icons can be implemented in various embodiments of the invention. For example, in some embodiments of the news application may be implemented. In this case, the application 106 can display news stories to a user. The dynamic icon 104 can display titles and/or summaries of the new stories available at the application 106.

In an alternative example, the application 106 may be a photo application. The application 106 may be used to view various photographs stored on the device 100. The dynamic icon 104 may iteratively display thumbnails of the photos available on the application 106.

In an alternative example, the application 106 may be a music application. The user may access the music application 106 to access albums, songs, playlists or other musical entities. The dynamic icon 104 may iteratively display various album covers, song titles, etc.

In an alternative example, the application 106 may be a game dashboard. In this example, the user may navigate to the game dashboard to select various games that the user can play. The dynamic icon 104 may display thumbnail images of different games available to be played in the game dashboard application 106.

In an alternative example, the application 106 may be a stock ticker application. A user may be able to use the application 106 to the video various stock prices and other financial information. The dynamic icon 104 in this example may iteratively display various stock prices.

Various other applications, although not enumerated here, may be implemented in other embodiments.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
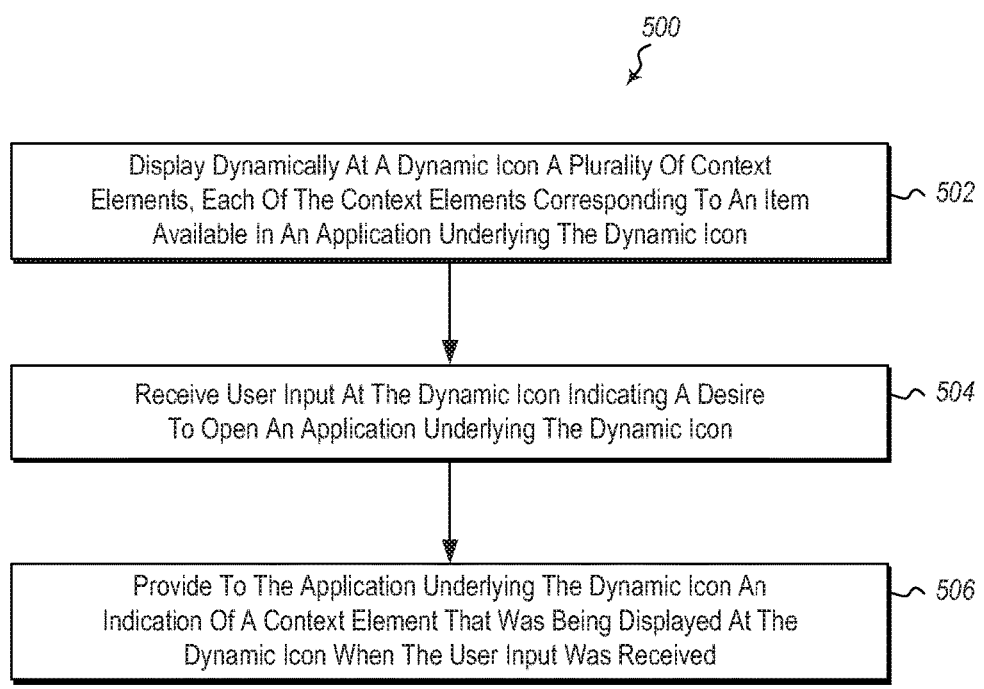
FIG. 5 illustrates a method of providing context from a dynamic icon to an underlying application

Referring now to FIG. 5, a method 500 is illustrated. The method 500 may be practiced in a computing environment. The method 500 includes acts for providing context from a dynamic icon to an underlying application. The method 500 includes displaying dynamically at a dynamic icon a plurality of context elements, each of the context elements corresponding to an item available in an application underlying the dynamic icon (act 502). For example, FIG. 1 illustrates a dynamic icon 104 that the displays various elements such as the element 108. The elements displayed in the dynamic icon 104 may be updated periodically and iteratively to illustrate items available on an underlying application underlying the dynamic icon 104.

The method 500 further includes receiving user input at the dynamic icon indicating a desire to open an application underlying the dynamic icon (act 504). For example, a user may tap the dynamic icon 104 demonstrating a desire to open an underlying application underlying the dynamic icon 104.

The method 500 further includes providing to the application underlying the dynamic icon an indication of a context element that was being displayed at the dynamic icon when the user input was received (act 506). For example, as illustrated in FIG. 4, the agent 116 may provide an item ID 114 to the application 106.

The method 500 may further include the application highlighting in a list of available items an item corresponding to the context element that was being displayed on the dynamic icon when the user input was received. An example of this is illustrated in FIG. 2 where the application 106 highlights a news item in a list of items 110 as illustrated at 112.

The method 500 may further include, the application automatically navigating to and displaying an item corresponding to the context element that was being displayed on the dynamic icon when the user input was received. An example of this is illustrated in Figure three where the application 106 automatically opens an item for display to a user based on an element being displayed in the dynamic icon 101 when the dynamic icon 104 was selected by a user.

The method 500 may further include an agent receiving from the application an identifier for the context element that was being displayed. For example, FIG. 4 illustrates that the agent 116 receives an item ID 114 from the application 106. In such embodiments, providing to the application underlying the dynamic icon an indication of a context element that was being displayed on the dynamic icon when the user input was received may include the agent providing the identifier back to the application underlying the dynamic icon. For example, the agent 116 in shown returning the item ID 114 to the application 106 when the dynamic icon 104 is selected.

The method 500 may be practiced where the dynamic icon is a live tile. For example, the dynamic icon 104 may be a live tile available from Microsoft Corporation, of a Redmond, Wash.

The method 500 may be practiced where the dynamic icon is a widget. For example, the dynamic icon 104 may be a widget available in many phone and portable device applications.

The method 500 may be practiced where the dynamic icon is an icon that iteratively displays elements corresponding to items available on the application underlying the dynamic icon.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks in a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard. Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system with an architecture that uses a dynamic icon to launch an underlying application based on information displayed at the dynamic icon rather than merely launching the underlying application without any context for the underlying application when launched, and wherein the system architecture performs at least the following:

on an interface of a computer device, displays a dynamic icon that represents an underlying application that is launched when the dynamic icon is selected, wherein the dynamic icon displays for a limited time a first context element that corresponds to an item of interest derived from the underlying application, and then after the limited time expires, one or more further context elements that correspond to one or more other items of interest derived from the underlying application are displayed in succession for a limited time;

receives user input at the interface that results in selecting the dynamic icon during one of the limited times;

transmits information that identifies a particular context element displayed at the dynamic icon at the time the dynamic icon was selected, wherein the information identifying the particular context element is transmitted from the dynamic icon to the underlying application; and launches the underlying application based on the transmitted information, wherein the underlying application is launched so as to reference the particular context element that was displayed when the dynamic icon was selected, and wherein launching the underlying application so as to reference the particular context element that was displayed when the dynamic icon was selected comprises launching the application with a list of available items that includes an item corresponding to the particular context element that was being displayed on the dynamic icon when the dynamic icon was selected.

2. The system of claim 1, wherein the underlying application is launched so as to automatically navigate to and display an item corresponding to the particular context element that was being displayed on the dynamic icon when the dynamic icon was selected.

3. The system of claim 1, wherein the system architecture further comprises an agent that receives from the underlying application an identifier for each context element displayed at the dynamic icon, and wherein the agent provides to the underlying application the information identifying the particular context element that is transmitted from the dynamic icon to the underlying application.

4. The system of claim 1, wherein the dynamic icon is a live tile.

5. The system of claim 1, wherein the dynamic icon is a widget.

6. The system of claim 1, wherein the dynamic icon iteratively displays the context elements displayed at the dynamic icon.

7. A computer-implemented method of using a dynamic icon to launch an underlying application based on information displayed at the dynamic icon rather than merely launching the underlying application without any context for the underlying application, the computer-implemented method comprising:

on an interface of a computer device, displaying a dynamic icon that represents an underlying application that is launched when the dynamic icon is selected, wherein the dynamic icon displays for a limited time a first context element that corresponds to an item of interest derived from the underlying application, and then after the limited time expires, one or more further context elements that correspond to one or more other items of interest derived from the underlying application are displayed in succession for a limited time;

receiving user input at the interface that results in selecting the dynamic icon during one of the limited times;

transmitting information that identifies a particular context element displayed at the dynamic icon at the time the dynamic icon was selected, wherein the information identifying the particular context element is transmitted from the dynamic icon to the underlying application; and launching the underlying application based on the transmitted information, wherein the underlying application is launched so as to reference the particular context element that was displayed when the dynamic icon was selected, and wherein launching the underlying application so as to reference the particular context element that was displayed when the dynamic icon was selected comprises launching the application with a list of available items that includes an item corresponding to the particular context element that was being displayed on the dynamic icon when the dynamic icon was selected.

8. The computer-implemented method of claim 7, wherein the underlying application is launched so as to automatically navigate to and display an item corresponding to the particular context element that was being displayed on the dynamic icon when the dynamic icon was selected.

9. The computer-implemented method of claim 7, wherein an agent receives from the underlying application an identifier for each context element displayed at the dynamic icon, and wherein the agent provides to the underlying application the information identifying the particular context element that is transmitted from the dynamic icon to the underlying application.

10. The computer-implemented method of claim 7, further comprising determining user preferences based on one or more context elements that are displayed at the dynamic icon.

11. The computer-implemented method of claim 10, wherein the user preferences are determined based on an amount of time between when a context element is displayed and when the user input is received.

12. The computer-implemented method of claim 10, wherein the user preferences are determined based on a time of day when the user input is received.

13. A computer system comprising:

an application, wherein the application sends information for one or more items of interest derived from the application, and wherein the information sent is used for displaying a corresponding context element at a dynamic icon for the each item;

a user interface that displays a dynamic icon that represents the application and that launches the application when the dynamic icon is selected, and wherein the dynamic icon displays for a limited time a first context element that corresponds to a first item of interest derived from the application, and then after the limited time expires, one or more further context elements that correspond to one or more other items of interest derived from the application are displayed in succession for a limited time;

an agent that receives the information sent by the application for the one or more items of interest, and wherein the agent then correlates corresponding context elements displayed at the dynamic icon with the one or more items of interest;

wherein user input is received at the interface that results in selecting the dynamic icon during one of the limited times;

wherein the dynamic icon then transmits information back to the agent that identifies a particular context element displayed at the dynamic icon at the time the dynamic icon was selected;

wherein the agent then transmits the information identifying the particular context element to the application; and wherein the application is then launched based on the transmitted information so as to reference the particular context element that was displayed when the dynamic icon was selected, and wherein launching the underlying application so as to reference the particular context element that was displayed when the dynamic icon was selected comprises launching the application with a list of available items that includes an item corresponding to the particular context element that was being displayed on the dynamic icon when the dynamic icon was selected.

14. The system of claim 13, wherein the application determines user preferences based on one or more context elements that are displayed at the dynamic icon when the user input is received and wherein the application then updates context elements displayed at the dynamic icon according to the determined user preferences.

15. The system of claim 13, wherein the application is launched so as to automatically navigate to and display an item corresponding to the particular context element that was being displayed on the dynamic icon when the dynamic icon was selected.

16. The system of claim 13, wherein the dynamic icon iteratively displays the context elements displayed at the dynamic icon.

17. The system of claim 13, wherein the dynamic icon is a widget.

* * * * *